Feb. 21, 1967 W. C. DVORAK 3,304,656

FARM GATE

Filed Aug. 17, 1964

INVENTOR
Wencil C. Dvorak
BY Hiram A. Steeger
agent

United States Patent Office 3,304,656
Patented Feb. 21, 1967

3,304,656
FARM GATE
Wencil C. Dvorak, Rte. 2, Dodge, Nebr. 68633
Filed Aug. 17, 1964, Ser. No. 389,919
1 Claim. (Cl. 49—247)

The present invention relates to a farm gate of the type pivotally mounted in a vertical plane and designed to be elevated to pass over snow, ice, rocks, and the like, in opening and closing movements thereof, and in particular a gate pivotally mounted by a bolt at a point substantially midway of the height thereof and retained in a horizontal position by bolts spaced above and below the pivot bolt and additionally held by a spring on one of said bolts.

The purpose of this invention is to provide a farm gate which swings in a vertical plane and which may be reversed so that it may be hung from either end.

Farm gates have been made of various designs and have been mounted by different means. Conventional gates are mounted by hinges, preferably at one end and the gates swing through horizontal planes. In numerous instances the surface of the ground is rough, such as after plowing or after snow storms and the like, and in such cases it is necessary to lift the gate over obstructions and where hinges are used this is difficult.

With this thought in mind this invention contemplates a pivotally mounted gate on a hinge or swinging element so that the extended or free end of the gate is easily raised.

The object of this invention is, therefore, to provide means for mounting a gate on a post whereby a gate is retained in a substantially horizontal position and wherein the extended end is readily raised and lowered.

Another object of this invention is to provide a pivotally mounted gate in which the gate is counter-balanced by a spring.

Another object of the invention is to provide a farm gate that swings in a vertical plane in which the gate may be hung from either end.

A further object of the invention is to provide a farm gate pivotally mounted to swing in a vertical plane and counter-balanced by a spring in which tension of the spring is adjustable.

A still further object is to provide a farm gate pivotally mounted to swing in a vertical plane in which the gate is of simple and economical construction.

Other and further objects and advantages of the present invention will be apparent from the following detailed description, drawings and claim, the scope of the invention not being limited to the illustration of the drawings as the drawings are only for the purpose of illustrating a method by which the principles of this invention can be applied.

Other embodiments of the invention utilizing the same or equivalent principles may be used and structural changes may be made as desired by those skilled in the art without departing from the present invention and the purview of the appended claim.

Other features and advantages of the invention will appear from the following description taken in connection with the drawing, wherein.

Figure 1:
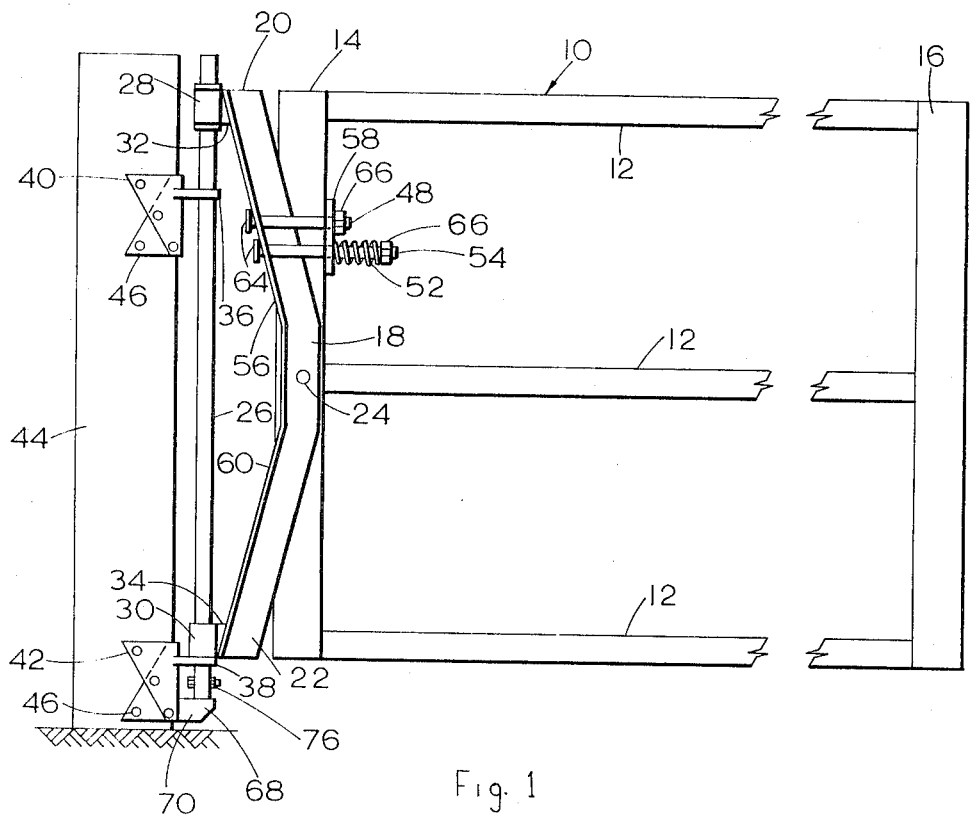
FIGURE 1 is a front elevational view of a gate pivotally mounted at one end and with parts broken away.
Figure 2:
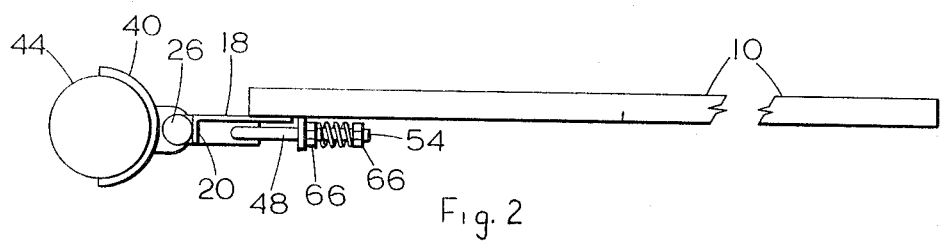
FIGURE 2 is a plan view of the gate shown in FIGURE 1 also with parts broken away.

While one embodiment of the invention is illustrated in the above-referred-to drawing, it is to be understood that it is merely for the purpose of illustration and that various changes in construction may be resorted to in the course of manufacture in order that the invention may be utilized to the best advantage according to circumstances which may arise, without in any manner departing from the spirit and intention of the device, which is to be limited only in accordance with the appended claims. And while there is stated the primary field of utility of the invention it remains obvious that it may be employed in any other capacity wherein it may be found applicable.

In the accompanying drawing, and in the following specification, the same reference characters are used to designate the same parts and elements throughout and in which the numeral 10 refers to a gate having horizontal rails 12, the ends of which are connected by vertically disposed plates 14 and 16, numeral 18 indicating an angle bar hinge member having inclined ends 20 and 22 and pivotally connected to the plate 14 of the gate by a pivot pin 24, numeral 26 indicating a vertically disposed shaft extended through collars 28 and 30 connected by webs 32 and 34 to the inclined ends 20 and 22 of the angle bar 18, and numerals 36 and 38 bearings through which the ends of the shaft 26 extend and which are provided with semi-circular flanges 40 and 42 by which the bearings are mounted on a post 44 by nails or other fasteners 46.

The gate is retained in a horizontal position by bolt 48, and the gate is counter-balanced and cushioned during vertical swinging movement by a spring 52 on a long bolt 54 in the upper part of the gate. The long bolt 54 extends through a flange 56 on the upper inclined section 20 of the angle bar 18, and also through a bar 58 on the plate 14 of the end of the gate. The bolts 48, and 54 are provided with heads 64 and nuts 66 to facilitate adjustment.

The bolt 48 extends slidably through the bar 58 and has its head end anchored to the flange 56 with its head 64 on the opposite side of the flange 56 from the bar 58 and with the bolt 48 extending through the flange 56. The nut 66 can be threadedly adjusted and drawn up against that side of the bar 58 which is opposite the head 64 and the bolt 48 for raising or lowering the down-most position of the free end of the gate at the plate 16.

The bolt 54 is anchored to the flange 56 by its head 64 in the same manner as the bolt 48. The bolt 54 extends slidably through the bar 58 with the spring 52 on the opposite side of the bar 58 from the post 44 with the nut 66 being threadedly adjustable along the bolt 54 and disposed on the opposite side of the spring 52 from the bar 58. The nut 66 can, therefore, be adjusted to regulate tension on the spring 52 so as to counter-balance the downward pull of gravity on the free-swinging end of the gate, thereby making the free-swinging end easier to lift. The bolts 48 and 54 are disposed on the upper side of the angle bar 18 from the pivot pin 24.

The lower end of the shaft 26 is seated in a retainer 68 carried by an arm 70 extended from the lower bearing 38, and the retainer is held in place by a clamp 76.

Figures 3, 4:
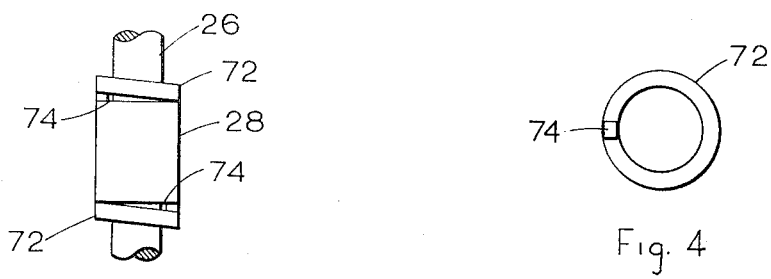
FIGURE 3 is a side elevational view of one of the hinge elements of the gate with washers in the mounting retained in inclined positions by pins projecting from the washers.
FIGURE 4 is a plan view of the hinge element shown in FIGURE 3 showing the position of a pin on the end of the element.

The collar 28 is retained in position by washers 72 having pins 74 projecting from one of the sides thereof, as shown in FIGURE 3.

With the parts assembled as illustrated and described a farm gate may be mounted on a post, with either end of the gate attached to the post, and with the spring 52 properly adjusted the gate will assume a horizontal position. By this adjustment the extended end of the gate is spaced any desirable distance above the ground, and said extended end may be raised over a clump of ice or snow, or over any obstruction.

As thus described, it will be seen that the pivot pin 24 provides a horizontal pivot axis about which the gate is adapted to pivot and the spring 52 and its bolt 54 and associated parts provide a means interconnecting the pin 24 and the bar 18 for exerting a constant pressure against the gate 10 to counter-balance gravity to urge its other end, namely, the end opposite the other end. The spring 52 is sufficiently elongated and resilient as to affect such counter-balancing and to cause the free end of the gate to be measurably easier to raise even at times when it has already been substantially raised from a horizontal position, whereby it can be caused to clear snow, ice, ground, hummocks, etc.

It will be seen that the washers 72 can all be called the retainer 72 and a lower washer 72 is disposed beneath the collar 28 and is of a ring-shape receiving the shaft 26 and has its pin 74 projecting upwardly therefrom toward the collar 28, whereby downward pressure from the collar 28 tends to push downwardly on pin 74 causing the washer 72 to assume an inclined position with respect to shaft 26, as shown in FIGURE 3, whereby it binds on the shaft preventing downward movement of the collar along the shaft.

It will be seen that by relieving this downward pressure of collar 28, the washer 72 can be adjusted along the shaft 26.

Another collar 28 can be placed above the collar 28 to prevent the gate from being undesirably uplifted.

The bolt 50 is not present when the gate is used in the position shown in FIGURE 1, but the bolt 50 is shown in dotted lines to indicate its position when used in substitution for the bolt 48 when the gate is hung from its right end rather than from its left end.

From the foregoing description, it is thought to be obvious that a farm gate constructed in accordance with this invention is particularly well adapted for use, by reason of the convenience and facility with which it may be assembled and operated, and it will also be obvious that the invention is susceptible of some change and modification without departing from the principles and spirit thereof, and for this reason it is not desired to be limited to the precise arrangement and formation of the several parts herein shown in carrying out the invention in practice, except as claimed.

I claim:

A farm gate assembly of the character described comprising a gate post and a pair of bearings; means by which said bearings are adapted to be secured to said gate post in vertically spaced alignment with each other; a vertically disposed shaft rotatably mounted in said bearings; a hinge member comprising a mid section and a pair of inclined end sections one of which extends upwardly and rearwardly from said mid section and the other of which extends downwardly and rearwardly from said mid section; means secured to the free end of each of said end sections by which said hinge member is secured to said shaft for vertical adjustment thereon and for rotation therewith; a gate having a vertically disposed end plate, means by which said gate is connected to said hinge member for vertical swinging movement with respect thereto, said means comprising a pivot pin by which the mid-section of said hinge member is pivotally connected to said end plate intermediate the upper and lower ends thereof; adjustable interconnecting means between the upper inclined end of said hinge member and the said end plate of said gate which is operative to limit the downward swinging movement of said gate; and adjustable counterbalancing and cushioning means which is connected to and between the upper inclined end of said hinge member and the said end plate of said gate which is operative to counter-balance said gate and to cushion the downward swinging movement thereof.

References Cited by the Examiner

UNITED STATES PATENTS

| | | | |
|---|---|---|---|
| 917,233 | 4/1909 | Wright | 39—78 |
| 950,526 | 3/1910 | Wyman | 39—82 |
| 992,637 | 5/1911 | Berndt | 16—132 |
| 1,038,854 | 9/1912 | Corcoran | 39—76 |
| 1,168,235 | 1/1916 | Tausch | 16—132 |
| 2,795,451 | 6/1957 | Rucker | 292—306 |

HARRISON R. MOSELEY, *Primary Examiner.*

D. L. TAYLOR, *Assistant Examiner.*